US008683555B2

(12) United States Patent
Romero et al.

(10) Patent No.: US 8,683,555 B2
(45) Date of Patent: Mar. 25, 2014

(54) SYSTEMS AND METHODS TO PREVENT DENIAL OF SERVICE ATTACKS

(75) Inventors: Ric Romero, Tucson, AZ (US); Lance R. Reidhead, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 854 days.

(21) Appl. No.: 12/703,566

(22) Filed: Feb. 10, 2010

(65) Prior Publication Data

US 2011/0196965 A1   Aug. 11, 2011

(51) Int. Cl.
G06F 7/04      (2006.01)
G06F 11/30    (2006.01)
G06F 15/16    (2006.01)

(52) U.S. Cl.
USPC ............................... 726/4; 713/188; 709/225

(58) Field of Classification Search
USPC ................ 709/225; 375/140; 726/4
See application file for complete search history.

(56) References Cited

U.S. PATENT DOCUMENTS

| 5,056,105 | A |   | 10/1991 | Darmon et al. |
| 5,414,771 | A | * | 5/1995 | Fawcett, Jr. ............... 380/44 |
| 5,864,491 | A | * | 1/1999 | Smeets ...................... 708/250 |
| 2002/0138850 | A1 * | | 9/2002 | Basil et al. ................ 725/117 |
| 2005/0100102 | A1 * | | 5/2005 | Gazdzinski et al. ...... 375/242 |
| 2010/0029278 | A1 * | | 2/2010 | Fang et al. ................ 455/436 |
| 2010/0223399 | A1 * | | 9/2010 | Kim et al. ................. 709/248 |

FOREIGN PATENT DOCUMENTS

EP          0331115 A2     6/1989

OTHER PUBLICATIONS

European Patent Office, International Searching Authority, "International Search Report" mailed Feb. 7, 2011; International Appln. No. PCT/US2010/056161, filed Nov. 10, 2010.
Wood, Anthony D. et al. "DEEJAM: Defeating Energy-Efficient Jamming in IEEE 802.15.4-based Wireless Networks," Sensor, Mesh and Ad Hoc Communications and Networks, 2007. SECON & APOS; 07. 4th Annual IEEE Communications Society Conference on, IEEE, PI, Jun. 1, 2007, pp. 60-69, XP031128697, ISGN: 978-1-4244-1268-6; abstract, ch. I, "Introduction"; pp. 60-61, ch. IV, "DEEJAM: Defeating amming," sec. B, "Defense 1: Frame Masking"; p. 63.
Lin Guolong et al. "On Link Layer Denial of Service in Data Wireless LANs," John Wiley Online Library, Wireless communications and Mobile Computing, vol. 5, No. 3; Aug. 23, 2004, pp. 273-284, XP002618012, DOI: 10.1002/wcm.221, retrieved from the Internet: URL:http://onlinelibrary.wiley.com/doi/10.1002/wcm.221/pdf [retrieved on Jan. 24, 2011], abstract, sec. 1, "Introduction"; pp. 273-274, sec. 4.2, "Multiple Codeword Binary Code"; pp. 279-280.
"International Application U.S. Serial No. PCT/US2010/056161, International Preliminary Report on Patentability mailed Aug. 23, 2012", 8 pgs.

* cited by examiner

*Primary Examiner* — Krista Zele
*Assistant Examiner* — Margishi Desai
(74) *Attorney, Agent, or Firm* — Schwegman, Lundberg & Woessner, P.A.

(57) ABSTRACT

Systems and methods are presented to prevent denial of service attacks through the use of an interleaved pseudo-random sequence that is generated from two or more pseudo-random codes. Portions of the pseudo-random codes are interleaved with each other using a pre-determined instruction pattern. A message incorporating the interleaved sequence is transmitted to a receiver, which identifies the interleaved bit sequence in the message and, if the interleaved bit sequence is identified in the message, allows access to the service.

23 Claims, 3 Drawing Sheets

SYSTEMS AND METHODS TO PREVENT DENIAL OF SERVICE ATTACKS

GOVERNMENT RIGHTS

This invention was made with United States Government support under Contract Number HQ0276-08-C-0001 with the Department of Defense. The United States Government has certain rights in this invention.

TECHNICAL FIELD

The following discussion generally relates to data communications and security. More particularly, the following discussion relates to systems and techniques that may be used to prevent denial of service attacks.

BACKGROUND

Digital communications are widely used in personal, commercial, industrial, military and other settings. In a typical communication session, a digital message is represented with electromagnetic signals, such as electrical voltages or modulated radio waves, that can be transmitted across wires, optical fibers, wireless media, or the like. Some digital communications take place over point-to-point links (such as an optical fiber or other wired connection) that can be readily secured by limiting physical access to the communications medium. Other communications occur over public or private networks (e.g., the Internet) or over wireless media where physical security is much more difficult.

Wireless and other physically-accessible networks are generally much easier to implement than secure dedicated links. The convenience of the Internet and various wireless networks, for example, has led to widespread use of such networks in many different settings. This openness, however, can lend itself to various types of security threats. Unauthorized listeners, for example, may be able to "listen in" on data communications that are not encrypted or otherwise obscured. For this reason, sensitive data is often encrypted or otherwise obscured prior to transmission across a public or other unsecure network.

Another type of security threat is a so-called "denial of service" (DOS) attack, in which authorized users are prevented from gaining access to a service that is available on a network. In a DOS attack, the attacker generally overwhelms the service with unnecessary data so that resources are not available for legitimate users. A typical DOS attack may involve numerous computers simultaneously requesting access to the service, thereby consuming processing and communications resources that would otherwise be available for rightful users. DOS attacks are particularly bothersome when the attacker knows the correct preamble, synchronization or other data values that are typically provided by legitimate users of the service. Such data may be obtained, for example, by capturing a legitimate message and then re-transmitting (or "replaying") the same data to the service at a later time. DOS attacks may be mounted against web sites or other network services, as well as against cellular telephone systems (e.g., by overwhelming a base station or other resource with new requests for access or other data), military or public safety communications systems, or any other services that are accessible by unsecured wired or wireless media.

It is therefore desirable to create systems and techniques to prevent denial-of-service attacks. It is further desirable that such systems and techniques be effective, yet computationally manageable. These and other desirable features and characteristics will become apparent from the subsequent detailed description and the appended claims, taken in conjunction with the accompanying drawings and this background section.

BRIEF DESCRIPTION

Various embodiments provide systems and methods to avoid denial of service attacks by placing an interleaved bit sequence constructed from two or more different pseudo-random codes in valid messages. By creating multiple pseudo-random codes and then interleaving the various codes together, a robust bit sequence can be efficiently computed.

Various embodiments provide a method that is executable by a data receiver that is configured to provide a service. The method suitably comprises generating a first pseudo-random code and a second pseudo-random code at the data receiver, interleaving the first and second pseudo-random codes with the data receiver using a pre-determined instruction to create an interleaved bit sequence, receiving a message from a transmitter at the data receiver, identifying the interleaved bit sequence in the message, and, if the interleaved bit sequence is identified in the message, allowing access to the service, and otherwise denying access to the service.

Other embodiments provide a system configured to provide a service in response to a message received via a data communications medium. The system suitably comprises an interface to the data communications medium, and a processor that is coupled to the interface. The processor is configured to generate a first pseudo-random code and a second pseudo-random code, to interleave the first and second pseudo-random codes to create an interleaved bit sequence, to receive the message via the interface, to identify the interleaved bit sequence in the message, and to allow access to the service only if the message comprises the interleaved bit sequence, wherein the interleaved bit sequence comprises a first pseudo-random bit code interleaved with a second pseudo-random code.

Still other embodiments provide a method executable by a data transmitter. The method suitably comprises generating a first pseudo-random code and a second pseudo-random code at the data transmitter, interleaving the first and second pseudo-random codes using a pre-determined instruction by the data transmitter to create an interleaved bit sequence, and transmitting a message that comprises the interleaved bit sequence from the data transmitter to a receiver.

The various implementations may be enhanced or modified in many different ways to create any number of alternate embodiments. Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a diagram of an exemplary digital communications system.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various embodiments provide systems and techniques for avoiding denial of service attacks by discarding or otherwise ignoring service requests that do not present a particular pseudo-random digital code that is generated using two or more different but interleaved pseudo-random bit sequences. Each bit sequence may be generated using a different algorithm and/or other parameter to increase unpredictability. The multiple pseudo-random sequences are then interleaved with each other according to a pre-determined instruction pattern so that the interleaved bit sequence is difficult to predict without prior knowledge of the instruction pattern and/or the information used to generate the random sequences. Moreover, the pseudorandom sequences and/or the particular interleaving pattern may be changed in subsequent request messages to avoid replay attacks and to make predictability even more difficult. In addition to providing a robust defense against denial of service attacks, the interleaved combination of two or more digital bit sequences may exhibit favorable autocorrelation and cross-correlation properties, making such techniques suitable for use in many different military or other secure environments. Additional details of several exemplary embodiments are presented below.

The various systems and techniques described herein may find use in any number of settings. For convenience, the following discussion may emphasize wireless services, such as those used in military settings. Equivalent systems and techniques, however, may be applied in any military, commercial, industrial, personal or other setting that uses any sort of wired or wireless network media to provide communications to any sort of network service.

Figure 1:
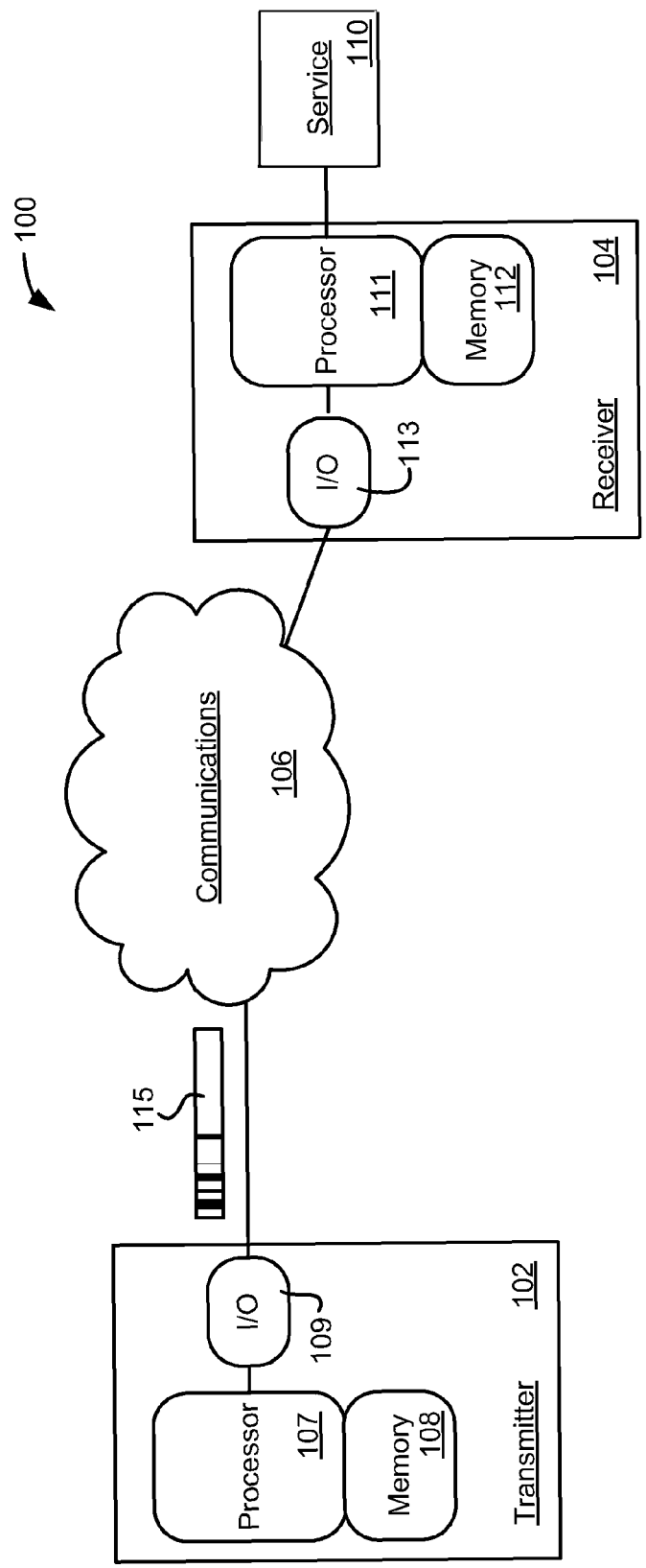

Turning to the drawing figures and with reference now to FIG. 1, an exemplary communications system 100 suitably includes one or more transmitting systems 102 attempting to legitimately gain access to a service no provided by a server or other receiving system 104. Transmitting system (abbreviated as "transmitter" herein) 102 and receiving system (abbreviated as "receiver") 104 communicate using any sort of wired or wireless communications medium 106 as appropriate. In various embodiments, transmitter 102 suitably transmits a message 115 to receiver 104 that includes a hybrid bit sequence generated by interleaving two or more different pseudo-random bit patterns, as described more fully below. Receiver 104 is able to identify the appropriate bit sequence in message 115, and to thereby differentiate between legitimate messages 115 and other undesired messages that may be part of a denial of service attack.

The general concepts, systems and techniques that are described herein may be well-suited for any number of communications systems, environments and applications. Transmitter 102 is any sort of digital computing device or other client node operating on medium 106. In various embodiments, transmitter 102 may be implemented using any sort of computer, personal digital assistant, mobile telephone, sensor and/or other client node as desired. As shown in FIG. 1, transmitter 102 suitably includes any sort of conventional processor 107, memory 108 and input/output features 109 as desired.

Receiver 104 is any sort of server or other node capable of providing a service 110 via communications media 106. In various embodiments, receiver 104 represents a network server that provides web content or other data via the Internet or any other network. In other embodiments, receiver 104 is a receiver interface to a control system, military effector and/or other service no as desired. The exemplary receiver 104 shown in FIG. 1 includes a processor 111, a memory 112 and input/output features 113 that correspond to hardware found in conventional server systems compatible with any sort of communications media 106.

To that end, processors 107 and 111 are each implemented using any sort of microprocessor, microcontroller, digital signal processor, programmed logic array and/or other programmable hardware capable of executing the various functions described herein under the direction of any sort of software, firmware or other control logic. Other embodiments may be implemented in dedicated processing hardware, firmware and/or other means for processing data, including any sort of common gate array, ASIC, or other programmed or programmable digital logic as desired. Input/output features 109 and 113 may include any sort of conventional wired or wireless network interface, and/or any sort of physical and/or logical resources used to support communications on medium 106.

Medium 106 is any wired and/or wireless link, network and/or other medium capable of supporting communications between transmitter 102 and receiver 104. In various embodiments, medium 106 is any sort of local area or wide area network, such as the Internet or another public or private network that is based upon TCP/IP or other protocols. In other embodiments, medium 106 includes a wireless network, such as any network that is based upon CDMA, GSM, IEEE 802.11 and/or other protocols.

Figure 2:
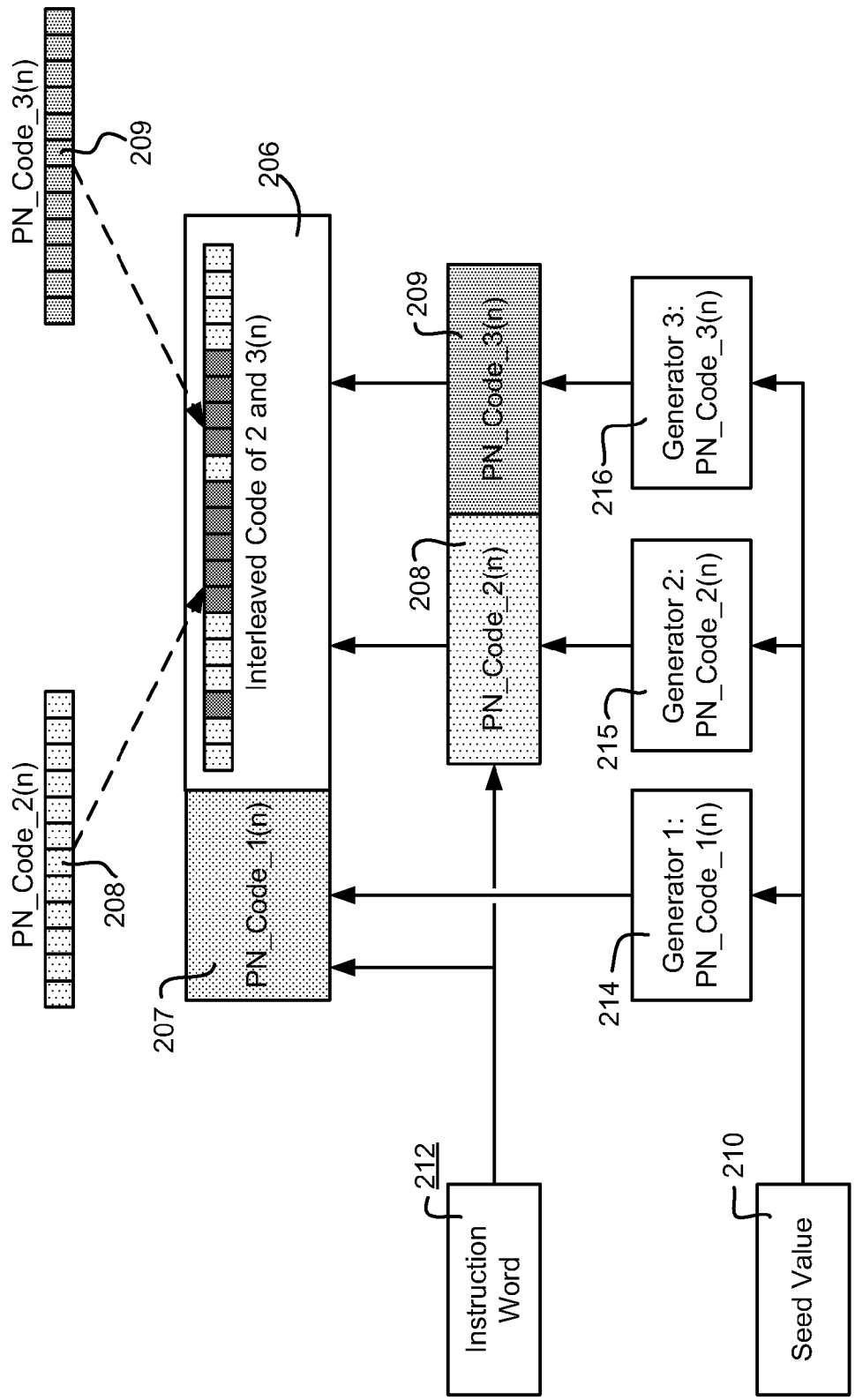
FIG. 2 is a block diagram of an exemplary process for creating one type of interleaved bit sequence.

Digital codes that are generated from interleaved combinations of two or more different bit sequences may be generated relatively easily using conventional hardware. FIG. 2 shows one example of a technique that could be used to create an interleaved pseudo-random bit sequence 206. This interleaved sequence 206 may be used by a transmitter to create a service request or other message 115 in some embodiments; sequence 206 may be similarly generated and used by a receiver 104 to identify matching sequences 206 in received messages 115. To that end, the various functions shown in FIG. 2 may be implemented using any sort of hardware, software, firmware and/or other logic, including logic that may be stored in memories 108 and/or 112 and executed by processors 107 and/or 111, respectively.

As shown in FIG. 2, two or more code generators 214, 215, 216 produce pseudo-random codes 207, 208, 209 (respectively) as a function of one or more seed values 210. In some embodiments, a common seed value 210 is applied to two or more different code generators 214-216. In other embodiments, each code generator 214-216 uses a different seed value 210, as appropriate.

The particular pseudo-random codes 207, 208, 209 may be produced using any algorithms or other techniques. Examples of algorithms that may be used in various embodiments include any of the various techniques associated with generating Gold codes, Walsh codes, Barker codes, Kasami codes and/or any other techniques that are currently known or subsequently developed. In various embodiments, each of the code generators 214, 215, 216 produces a resultant code 207, 208, 209 using a different algorithm. For example, an exemplary embodiment could generate code 207 as a Gold code, code 208 as a Walsh code and code 209 as a Barker code. Some implementations may compute different codes 207-209 using one or more common algorithms, but different seed values 210, if desired. Other embodiments may use any other techniques or combinations of techniques, as desired.

At least two of the generated pseudo-random codes (e.g., codes 208 and 209 in FIG. 2) are interleaved with each other using a pre-determined instruction 212. This instruction 212 suitably describes a pattern or other scheme by which certain bits of codes 208 and 209 are interspersed or otherwise combined with each other to create an interleaved bit sequence 206. Such patterns may be formulated and represented in instruction 212 in any manner. FIG. 2, for example, shows an exemplary pattern wherein two bits of code 208 are followed by a single bit of code 209, followed in sequence by three bits of code 208, five bits of code 209, one bit of code 208 and four bits of code 209, and then ending with four bits of code 208. In the example of FIG. 2, two of the bits generated with each code 208, 209 are not used in the interleaved sequence 206. These extra bits may be discarded or punctured to fit the desired length of the preamble. The particular pattern shown in FIG. 2 is an arbitrary example, and other embodiments may combine two or more codes 208, 209 in any other manner.

FIG. 2 also shows an additional pseudo-random code 207 that is not necessarily interspersed with codes 208 and 209, but that is nevertheless appended to or otherwise combined with interleaved sequence 206.

Alternate embodiments may similarly interleave any portion(s) of two or more codes 208-209 in any regular or irregular manner. The particular lengths of the codes 208, 209 and the length of interleaved sequence 206 may vary from embodiment to embodiment, and the order of bits placed in sequence 206 need not be the same as the order of bits in codes 208, 209. Any portion of bits from two or more codes 208, 209 may therefore be interleaved in any spatial or numerical order to create interleaved sequence 206.

Interleaved sequence 206 may be used for any purpose. In various embodiments, a transmitter 102 embeds sequence 206 in a message 115 along with payload data and any other header-type data as desired. In other embodiments, receiver 104 generates and uses sequence 206 to identify matching sequences 206 in received messages 115, as appropriate.

Figure 3:
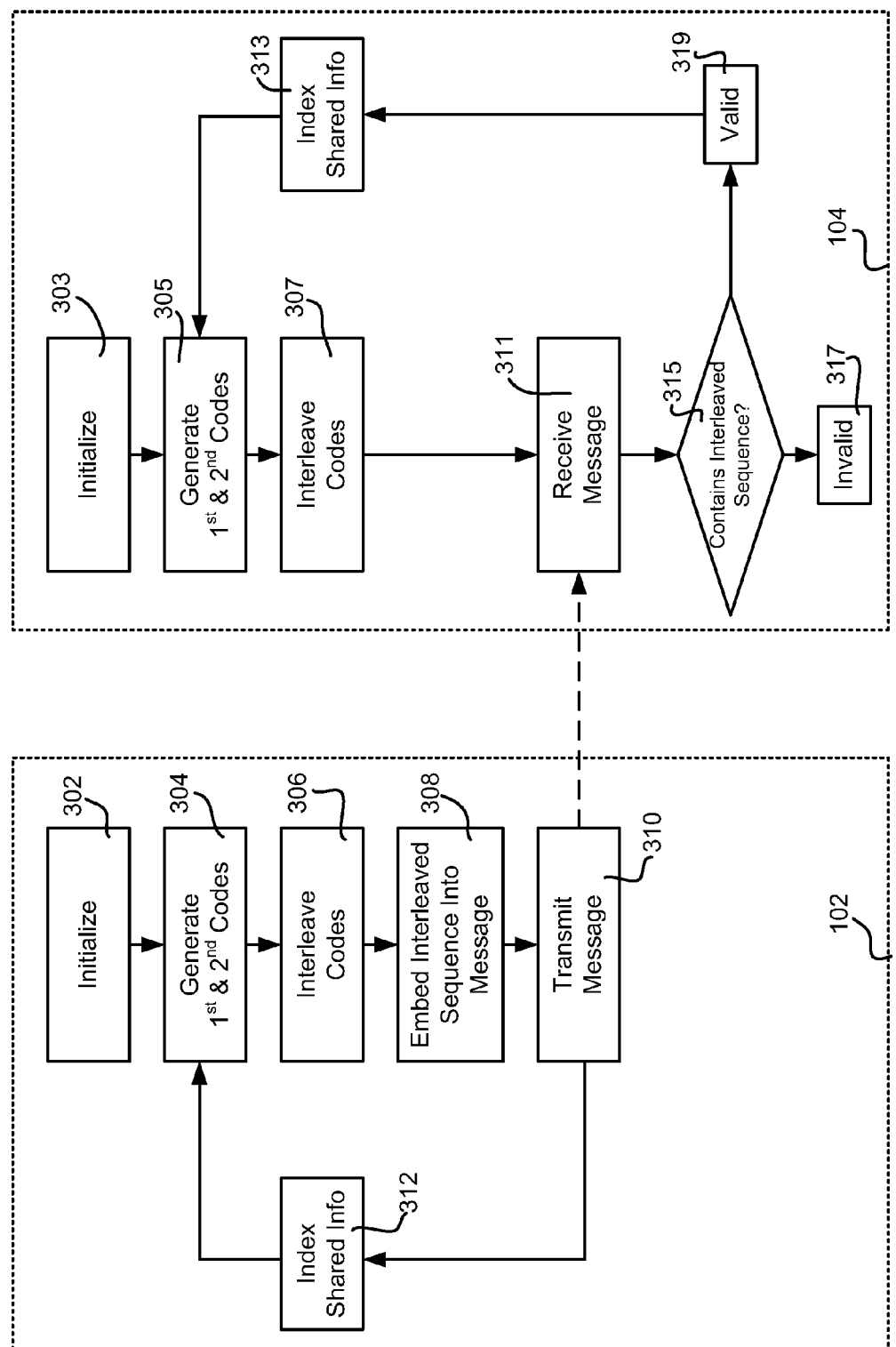
FIG. 3 is a flowchart of an exemplary process for reducing or preventing denial of service attacks using an interleaved bit sequence.

FIG. 3 shows an exemplary process 300 for avoiding, or at least reducing, the effects of denial of service attacks by using an interleaved bit sequence 206. Process 300 as shown in FIG. 3 includes various functions that may be performed by transmitter 102 and by receiver 104. Generally speaking, transmitter 102 generates first and second pseudo-random codes 208, 209 (function 304), interleaves the codes 208, 209 using a predetermined instruction 212 (function 306), embeds the interleaved sequence 206 into a message 115 (function 308), and transmits the message 115 to receiver 104 (function 310). Receiver 104 similarly generates first and second pseudo-random codes 208, 209 (function 305), interleaves the codes 208, 209 using predetermined instruction 212 to independently create the interleaved sequence 206 (function 307), and then identifies the interleaved sequence (function 315) in received messages 115. Messages 115 that contain the appropriate sequence 206 may be further processed (function 319), whereas messages that do not contain an appropriate sequence 206 may be discarded or otherwise treated as invalid (function 317). The functions shown in FIG. 3 may be supplemented, modified or differently-ordered in any number of equivalent embodiments.

The interleaved sequences 206 described above are typically computed using proprietary or other shared information. This information may include, for example, one or more initial seed values 210 used to generate pseudo-random codes 207-209, as well as one or more interleaving patterns represented by instruction 212. In various embodiments, the shared information established during an initiation phase (function 302 for transmitter 102, function 303 for receiver 104). Initialization takes place prior to transmission of message 115 so that both transmitter 102 and receiver 104 have enough information to generate and process a common interleaved sequence 206.

In various embodiments, pseudo-random seed values, instruction patterns 212 and/or any other appropriate data (e.g., AES or other cryptography keys) may be generated by either transmitter 102 or receiver 104 and shared with the other as appropriate. Sharing of secret data may be performed using a separate secure channel (e.g., a channel in which physical access is controlled, wherein end-to-end encryption is present, or that is otherwise secure enough for exchange of secret information without substantial concern for interception), or in any other manner. In some implementations, initial seed values and/or other secrets may be initially stored in a ROM, flash memory (e.g., memory 108 of transmitter 102) by an administrator or other trusted party prior to use. In other embodiments, shared secrets may be provided to transmitter 102 prior to use via physical media (e.g., a disk, ROM or the like), via a secure network (e.g., a secure LAN), and/or the like.

The interleaved sequence 206 may be created at transmitter 102 and at receiver 104 in any manner. As noted above, two or more different pseudo-random codes 208, 209 are generated by transmitter 102 (function 304) and receiver 104 (function 305). The different codes 208, 209 may be computed according to different algorithms (e.g., Gold, Walsh, Barker, Kasami and/or other codes) in some implementations. Other embodiments may use common algorithms but different pseudo-random number seeds so that different values 208, 209 result.

The generated codes 208, 209 are interleaved with each other using the pre-determined instruction 212 at both transmitter 102 (function 306) and receiver 104 (function 307). As noted above, any number of different codes 207-209 may be generated and combined in any manner. Bits from each code may be interspersed with each other in any order, and in any regular or irregular pattern. The interspersed bits may be appended, pre-pended or otherwise combined with additional code data (e.g., code 207 in FIG. 2), if desired.

Transmitter 102 suitably embeds the interleaved sequence 206 into a message 115 as appropriate. In various embodiments, message 115 is a conventional data communications packet or other message that is formatted according to any protocols associated with communications media 106. Interleaved bit sequence 206 may be placed in any location within message 115, such as in a header, footer or the like. In various embodiments, interleaved bit sequence 206 is placed in a preamble or header to a message 115 that is otherwise formatted in accordance with TCP/IP, wireless or other conventional protocols. Message 115 is then transmitted from transmitter 102 (using I/O interface 109) to receiver 104, which appropriately accepts the message 115 at I/O interface 113 for further processing (function 311).

Receiver 104 suitably analyzes received messages 115 to identify the interleaved sequence 206 in the preamble or other appropriate location (function 315). If the interleaved sequence 206 is recognized in the message 115, then the message 115 can be determined to be valid (function 319). Receiver 104 may therefore grant access to the service 110 in some embodiments, or at least continue processing message 115 or other messages received from transmitter 102. In various embodiments, receiver 104 subsequently processes payload data contained within message 115 if the proper interleaved sequence 206 is identified in function 315. This payload data may contain, for example, a request for data or services (e.g., a web page), an instruction to carry out an action (e.g., a call for fire or the like), or any other information as desired.

In various embodiments, the shared values may change from time to time or message to message as desired (functions 312, 313). That is, values may be changed on any temporal basis, or any operational basis (e.g., in response to a successful message, in response to a command to change values that is received from the other party, or any other technique). Changing values prevents replay attacks by ensuring that each sequence 206 is only valid for a single use, or for a sort period of time. Changing values during operation can further complicate reverse engineering of the interleaved sequence, therefore improving security and robustness. After a valid message 115 from transmitter 102 is processed by receiver 104, for example, pseudo-random number seeds 210 may be cycled, different instruction patterns 212 may be selected for use with the same or different pseudo-random values, and/or other changes may be implemented. In various embodiments, new pseudo-random seed values may be calculated as a function of the previous seed value according to any number of techniques. Interleaving patterns may be similarly modified from message to message 115 as desired. In various embodiments, transmitter 102 and receiver 104 each maintain several different values for instruction 212 in memory or the like. The different instruction patterns may be sequenced in any manner.

Generally speaking, each of the various functions shown in process 300 may be performed by computing hardware, firmware and/or software executing in any computing environment. In an exemplary embodiment, some or all of functions associated with transmitter 102 are implemented in software or firmware instructions that can be stored in memory 108 and executed by processor 107, whereas functions associated with receiver 104 may be implemented using software or firmware instructions that are stored in memory 112 and executed by processor 111. Other embodiments may use dedicated hardware logic for certain functions, and/or may implement the features of process 300 in any other manner.

Various systems and techniques for avoiding denial of service attacks are therefore described. As noted at the outset, these techniques and systems may be variously applied in any military, industrial, commercial, personal or other setting. Any number of modifications and enhancements could be formulated from the various examples described herein.

As used herein, the word "exemplary" means "serving as an example, instance, or illustration". "Exemplary" embodiments are not intended as models to be literally duplicated, but rather as examples that provide instances of embodiments that may be modified or altered in any way to create other embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. A method executable by a data receiver that is configured to provide a service, the method comprising:
generating a first pseudo-random code and a second pseudo-random code at the data receiver;
interleaving the first and second pseudo-random codes by the data receiver using a pre-determined instruction to create a first interleaved bit sequence, the interleaving including selecting a different interleaving scheme as the pre-determined instruction for each instance of the interleaving of corresponding two or more pseudo-random codes;
receiving a message from a transmitter at the data receiver, the message including a second interleaved bit sequence embedded therein as formed at the transmitter based at least in part on interleaving a third pseudo-random code and a fourth pseudo-random code;
identifying the second interleaved bit sequence in the message received from the transmitter;
comparing the first interleaved bit sequence with the second interleaved bit sequence; and
if the second interleaved bit sequence is determined to match the first interleaved bit sequence, allowing access to the service, and otherwise denying access to the service, for the transmitter.

2. The method of claim 1, further comprising:
prior to receiving the message, initializing communications with the transmitter.

3. The method of claim 2, wherein the initializing comprises:
establishing the pre-determined instruction used to interleave the first and second pseudo-random codes.

4. The method of claim 2, wherein the initializing comprises:
establishing an initial seed value used in generating at least one of the first and second pseudo-random codes, the establishing including selecting a different seed value as the initial seed value for each instance of the generating of a corresponding one of the first and second pseudo-random codes.

5. The method of claim 4 wherein the first and second pseudo-random codes are both generated using the initial seed value.

6. The method of claim 4, further comprising:
repeating the generating and interleaving for a second message that comprises another interleaved bit sequence generated using a second seed value that is determined as a function of the initial seed value.

7. The method of claim 1 wherein the first and second pseudo-random codes are generated using different algorithms.

8. The method of claim 1 wherein the first and second pseudo-random codes are each generated in accordance with different ones of a group consisting of: a Gold code, a Walsh code, a Barker code, and a Kasami code.

9. The method of claim 1, wherein the message further comprises a third pseudo-random code that is not interleaved with the first and second pseudo-random codes, the first, second and third pseudo-random codes being generated based on a common seed value.

10. A system configured to provide a service in response to a message received from a transmitter via a data communications medium, the system comprising:
an interface to the data communications medium; and
a processor to execute a code processing logic, the code processing logic configured to generate a first pseudo-random code and a second pseudo-random code, to interleave the first and second pseudo-random codes to create a first interleaved bit sequence based upon a pre-determined instruction, a different interleaving scheme to be selected as the pre-determined instruction for each instance of interleaving corresponding two or more pseudo-random codes, the code processing logic to receive the message from the transmitter via the interface, the message including a second interleaved bit sequence embedded therein as formed at the transmitter based at least in part on interleaving a third pseudo-random code and a fourth pseudo-random code, and the code processing logic to identify the second interleaved bit sequence in the message, to compare the first interleaved bit sequence with the second interleaved bit sequence, and to allow access to the service only if the second interleaved bit sequence is determined to match the first interleaved bit sequence, wherein the first interleaved bit sequence comprises at least a portion of the first pseudo-random bit code interleaved with at least a portion of the second pseudo-random code.

11. The system of claim 10, wherein the code processing logic is further configured to:
    establish the pre-determined instruction used to interleave the first and second pseudo-random codes prior to receiving the message from the transmitter.

12. The system of claim 10, wherein the code processing logic is further configured to:
    establish an initial seed value to be used in generating at least one of the first and second pseudo-random codes prior to receiving the message from the transmitter, the establishing including selecting a different seed value as the initial seed value for each instance of the generating of a corresponding one of the first and second pseudo-random codes.

13. The system of claim 12 wherein the first and second pseudo-random codes are both generated using the initial seed value.

14. The system of claim 12, wherein the code processing logic is further configured to:
    generate another interleaved bit sequence using a second seed value that is determined as a function of the initial seed value.

15. A method executable by a data transmitter, the method comprising:
    generating a first pseudo-random code and a second pseudo-random code at the data transmitter;
    interleaving the first and second pseudo-random codes using a pre-determined instruction by the data transmitter to create an interleaved bit sequence, the interleaving including selecting a different interleaving scheme as the pre-determined instruction for each instance of the interleaving of corresponding two or more pseudo-random codes;
    embedding in a message the interleaved bit sequence as created as an outcome of the interleaving; and
    transmitting the message that comprises the interleaved bit sequence as created from the data transmitter to a receiver.

16. The method of claim 15, further comprising:
    repeating the generating, interleaving and transmitting for a second message that comprises another interleaved bit sequence generated using a second seed value that is determined as a function of an initial seed value used to generate the first and second pseudo-random codes.

17. The method of claim 15, further comprising:
    repeating the generating, interleaving and transmitting for another message that comprises a second predetermined instruction.

18. The method of claim 15, further comprising:
    prior to transmitting the message, establishing the pre-determined instruction used to interleave the first and second pseudo-random codes.

19. The method of claim 15 wherein the first and second pseudo-random codes are generated using different algorithms.

20. The method of claim 15, wherein the first and second pseudo-random codes are each generated in accordance with different ones of a group consisting of a Gold code, a Walsh code, a Barker code, and a Kasami code.

21. The method of claim 15, wherein the embedding of the interleaved bit sequence comprises discarding some of the first or the second pseudo-random codes that are not interleaved.

22. The method of claim 15, further comprising:
    generating a third pseudo-random code; and
    appending the entire third pseudo-random code to the interleaved bit sequence, the appending including refraining from interleaving a portion of the third pseudo-random code with the first or the second pseudo-random codes.

23. The method of claim 22, wherein the first, second and third pseudo-random codes are generated based on a same seed value.

* * * * *

UNITED STATES PATENT AND TRADEMARK OFFICE
CERTIFICATE OF CORRECTION

| | | |
|---|---|---|
| PATENT NO. | : 8,683,555 B2 | Page 1 of 1 |
| APPLICATION NO. | : 12/703566 | |
| DATED | : March 25, 2014 | |
| INVENTOR(S) | : Romero et al. | |

It is certified that error appears in the above-identified patent and that said Letters Patent is hereby corrected as shown below:

On the Title Page, Item (56), in column 2, under "Other Publications", line 19, after "Application", delete "U.S.", therefor In the Specification In column 3, line 67, delete "no" and insert --110--, therefor Signed and Sealed this
Seventh Day of October, 2014

Michelle K. Lee
*Deputy Director of the United States Patent and Trademark Office*